United States Patent
Fickett

(10) Patent No.: US 10,750,859 B1
(45) Date of Patent: Aug. 25, 2020

(54) SUPPORT RACK SYSTEMS

(71) Applicant: Glenn Fickett, Tempe, AZ (US)

(72) Inventor: Glenn Fickett, Tempe, AZ (US)

( * ) Notice: Subject to any disclaimer, the term of this patent is extended or adjusted under 35 U.S.C. 154(b) by 0 days.

(21) Appl. No.: 16/113,775

(22) Filed: Aug. 27, 2018

(51) Int. Cl.
*A47B 55/02* (2006.01)
*A47F 5/08* (2006.01)

(52) U.S. Cl.
CPC .............. *A47B 55/02* (2013.01); *A47F 5/083* (2013.01)

(58) Field of Classification Search
CPC .......... A47B 55/02; A47B 97/00; A47F 5/083
USPC ..................................................... 211/18, 22
See application file for complete search history.

(56) References Cited

U.S. PATENT DOCUMENTS

| | | | |
|---|---|---|---|
| 369,143 A | 8/1887 | White | |
| 615,995 A | 12/1898 | Leonard | |
| 1,190,502 A | 7/1916 | Anderson | |
| 1,502,418 A | 7/1924 | Amstein | |
| 1,667,669 A | 4/1928 | Megee | |
| 2,745,181 A | 5/1956 | Czerniewicz | |
| 2,767,003 A | 10/1956 | Gilmont | |
| 2,835,503 A | 5/1958 | Humphries et al. | |
| 3,007,708 A * | 11/1961 | Ochs ...................... | A47B 55/02 108/107 |
| 3,154,028 A * | 10/1964 | Hamilton ............... | A47B 55/02 108/186 |
| 3,637,186 A | 1/1972 | Greenfield | |
| 3,659,722 A * | 5/1972 | Carroll .................. | A47B 73/002 211/106 |
| 3,765,634 A | 10/1973 | Stempel | |
| 3,804,432 A | 4/1974 | Lehram | |
| 3,981,491 A | 9/1976 | Snyder | |
| 3,998,476 A | 12/1976 | Kazmark, Sr. | |
| 4,037,858 A | 7/1977 | Adams | |
| 4,101,107 A | 7/1978 | Antoszewski | |
| 4,294,561 A | 10/1981 | Chapman et al. | |
| 4,348,034 A | 9/1982 | Welt | |
| 4,433,935 A | 2/1984 | Main et al. | |
| 4,523,773 A | 6/1985 | Holtz | |
| 4,550,835 A | 11/1985 | Lynch | |
| 4,552,270 A * | 11/1985 | Lentz ...................... | B62H 3/12 211/17 |
| 4,586,618 A * | 5/1986 | Norman .................. | A47F 5/083 211/133.3 |
| 4,618,035 A | 10/1986 | Mao | |
| 4,702,380 A * | 10/1987 | Herman .................. | A47F 5/083 211/181.1 |
| D298,193 S | 10/1988 | Carlson | |

(Continued)

FOREIGN PATENT DOCUMENTS

| | | | | |
|---|---|---|---|---|
| DE | 202010004220 U1 * | 8/2011 | ............. | A47B 55/02 |
| EP | 00597150 A1 | 5/1994 | | |

(Continued)

*Primary Examiner* — Stanton L Krycinski
(74) *Attorney, Agent, or Firm* — Adam R. Stephenson, Ltd.

(57) ABSTRACT

Implementations of support racks may include: a plurality of posts. Each post may be configured to receive at least one hub coupled thereto. The support rack may include a plurality of rungs coupled substantially perpendicularly to the plurality of posts through a plurality of connectors. The support rack may also include one or more grids coupled to the plurality of rungs between the plurality of posts and a plurality of fasteners coupled to the plurality of posts. The plurality of fasteners may be configured to couple the support rack to a wall.

18 Claims, 9 Drawing Sheets

(56) References Cited

U.S. PATENT DOCUMENTS

| | | | |
|---|---|---|---|
| 4,807,837 A | 2/1989 | Gawlik et al. | |
| 4,813,550 A * | 3/1989 | Saeks | A47B 96/1408 211/17 |
| 4,884,702 A * | 12/1989 | Rekow | A47F 5/01 211/90.02 |
| 5,044,505 A * | 9/1991 | Spratt | A47B 57/54 211/189 |
| 5,050,785 A | 9/1991 | Hays | |
| 5,078,276 A | 1/1992 | Rogge et al. | |
| 5,083,729 A | 1/1992 | Saeks et al. | |
| 5,086,930 A * | 2/1992 | Saeks | B62H 3/12 211/17 |
| D327,105 S | 6/1992 | Smith, Jr. | |
| 5,161,768 A | 11/1992 | Sarabin | |
| 5,222,707 A | 6/1993 | Myers | |
| 5,238,125 A | 8/1993 | Smith | |
| 5,253,770 A * | 10/1993 | Rosenthal | A47F 5/0025 211/106 |
| 5,255,803 A * | 10/1993 | Pavone | A47F 5/00 211/189 |
| D344,868 S | 3/1994 | Martinell | |
| 5,299,698 A * | 4/1994 | Gay | A47B 55/02 108/193 |
| 5,332,104 A | 7/1994 | Santella | |
| 5,335,782 A | 8/1994 | Herzog | |
| D358,048 S * | 5/1995 | Schoenig | D6/682.4 |
| 5,458,305 A | 10/1995 | Woodward | |
| 5,477,789 A | 12/1995 | Von Gunten | |
| 5,482,168 A * | 1/1996 | Welch | A47B 96/00 211/106 |
| 5,501,544 A | 3/1996 | Cairns | |
| D376,622 S * | 12/1996 | Roberts | D20/41 |
| 5,642,820 A | 7/1997 | Angeles | |
| 5,758,851 A | 6/1998 | Remmers | |
| 5,769,248 A * | 6/1998 | Johnson | A47F 5/0807 211/103 |
| 5,794,828 A | 8/1998 | Colan et al. | |
| 5,797,695 A | 8/1998 | Prusmack | |
| D398,469 S | 9/1998 | Leong et al. | |
| 5,842,581 A | 12/1998 | Graefe | |
| 5,855,283 A * | 1/1999 | Johnson | A47F 1/126 211/103 |
| 5,862,924 A | 1/1999 | Dumont | |
| D417,353 S | 12/1999 | Laga | |
| 6,062,402 A * | 5/2000 | Ford | A47F 5/083 211/181.1 |
| D437,164 S | 2/2001 | Fickett | |
| 6,241,107 B1 * | 6/2001 | Boyer | A47F 5/137 211/106 |
| 6,299,001 B1 * | 10/2001 | Frolov | A47F 5/01 211/106 |
| 6,305,037 B1 | 10/2001 | Cheng | |
| 6,396,015 B1 | 5/2002 | Ko | |
| 6,494,327 B2 * | 12/2002 | Huang | A47F 5/0892 211/107 |
| 6,564,952 B1 * | 5/2003 | Suttles | A47B 55/02 211/187 |
| 6,643,900 B2 * | 11/2003 | Jahrling | A47B 55/02 24/336 |
| 6,679,388 B1 * | 1/2004 | Chiu | B62H 3/12 211/22 |
| 6,843,380 B1 | 1/2005 | Fickett | |
| 6,983,853 B1 | 1/2006 | Fickett | |
| 7,249,680 B2 * | 7/2007 | Wang | A47B 57/04 211/150 |
| 7,314,143 B1 * | 1/2008 | Johnson | A47B 57/20 211/103 |
| 7,448,634 B1 * | 11/2008 | Raub | A47F 5/083 108/108 |
| 7,708,156 B2 * | 5/2010 | Johnson | A47B 57/487 211/103 |
| 8,528,748 B2 * | 9/2013 | Shaha | B62H 3/12 211/17 |
| 8,528,749 B2 * | 9/2013 | Kerman | B62H 3/00 211/196 |
| 8,540,088 B2 * | 9/2013 | Brasher | A47F 5/083 211/106 |
| 9,271,584 B1 * | 3/2016 | Weinstein | A47F 5/135 |
| 9,808,125 B2 * | 11/2017 | Jepson | A47K 3/281 |
| 9,877,599 B2 * | 1/2018 | Turner | A47F 1/121 |
| 10,058,172 B2 * | 8/2018 | Staib | A47F 5/13 |
| 2002/0027115 A1 * | 3/2002 | Gay | A47B 57/045 211/187 |
| 2004/0060884 A1 * | 4/2004 | Nook | A47F 5/0018 211/189 |
| 2004/0065632 A1 * | 4/2004 | Ondrasik | A47F 5/005 211/184 |
| 2004/0084392 A1 * | 5/2004 | Richter | A47F 5/0838 211/59.3 |
| 2004/0256341 A1 * | 12/2004 | Donnell | A47F 1/12 211/187 |
| 2005/0230338 A1 * | 10/2005 | Farinola | A47F 5/0838 211/186 |
| 2005/0279041 A1 * | 12/2005 | Staples | A47B 55/02 52/506.06 |
| 2006/0091092 A1 * | 5/2006 | Vosbikian | A47F 5/01 211/87.01 |
| 2006/0180557 A1 * | 8/2006 | Weinstein | A47B 55/02 211/40 |
| 2011/0278246 A1 * | 11/2011 | Daily | A47F 5/0018 211/59.2 |
| 2014/0149242 A1 * | 5/2014 | Turner, Jr. | A47B 55/02 705/26.1 |

FOREIGN PATENT DOCUMENTS

| | | | |
|---|---|---|---|
| EP | 2392228 A1 * | 12/2011 | A47B 55/02 |
| FR | 2458444 A1 | 1/1981 | |
| FR | 2711109 A1 | 4/1995 | |
| GB | 14740 | 8/1895 | |
| WO | 99/33695 A1 | 7/1999 | |

* cited by examiner

SUPPORT RACK SYSTEMS

BACKGROUND

1. Technical Field

Aspects of this document relate generally to support racks, such as racks for storing items.

2. Background

Items in homes or businesses may be stored in boxes, leaned against walls, on shelves, and other surfaces in a building.

SUMMARY

Implementations of support racks may include: a plurality of posts. Each post may be configured to receive at least one hub coupled thereto. The support rack may include a plurality of rungs coupled substantially perpendicularly to the plurality of posts through a plurality of connectors. The support rack may also include one or more grids coupled to the plurality of rungs between the plurality of posts and a plurality of fasteners coupled to the plurality of posts. The plurality of fasteners may be configured to couple the support rack to a wall.

Implementations of support racks may include one, all, or any of the following:

The plurality of connectors may include a base and two or more projections.

The plurality of posts may each include holes along a length of each of the posts.

The plurality of connectors may be coupled to the plurality of posts through pins inserted into the holes.

The at least one hub may be coupled to the plurality of posts through the holes.

The at least one hub may be configured to support a bicycle.

The grid may further include one or more supports coupled thereto configured to support items coupled to the grid.

Implementations of support racks may include: a plurality of posts where each post may be configured to receive at least one hub coupled thereto. The support racks may include a plurality of rungs coupled substantially perpendicularly to the plurality of posts through a plurality of connectors. The support racks may include a plurality of one or more grids coupled to the plurality of rungs between the plurality of posts. The support racks may also include a pair of legs coupled at a first end of the plurality of posts. The pair of legs may be configured to support the support rack above a floor surface.

Implementations of support racks may include one, all, or any of the following:

The plurality of posts may be configured to couple the support rack to a wall.

The plurality of posts and the pair of legs coupled at a first end of the plurality of posts further include a plurality of opposing posts and a pair of opposing legs.

The plurality of posts may each include holes along a length of each of the plurality of posts.

The plurality of connectors may be coupled to the plurality of posts through pins inserted into the holes.

The at least one hub may be coupled to the plurality of posts through the holes.

The at least one hub may be configured to support a bicycle.

The grid may further includes one or more supports coupled thereto and configured to support items coupled to the grid.

Implementations of support racks may include: a first set of posts substantially parallel to each other. Each post may include a first end and a second end. A set of rungs may be coupled substantially perpendicularly to the first set of posts through at least four connectors. The support racks may also include a grid coupled to each of the set of rungs. The first set of posts may be configured to support one or more hubs thereon. The one or more hubs may be configured to support a bicycle. The support rack may be configured to be coupled to a wall.

Implementations of support racks may include one, all, or any of the following:

The four connectors may be coupled to the first set of posts through pins.

The support racks may also include fasteners coupled to the first end and the second end of the first set of posts, the fasteners configured to couple the support rack to a wall.

The support racks may also include a pair of legs coupled at a first end of the first set of posts, the pair of legs configured to support the support rack against a wall.

The support racks may also include a basket coupled to the pair of legs.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended support rack will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such support racks, and implementing components and methods, consistent with the intended operation and methods.

Figure 1:
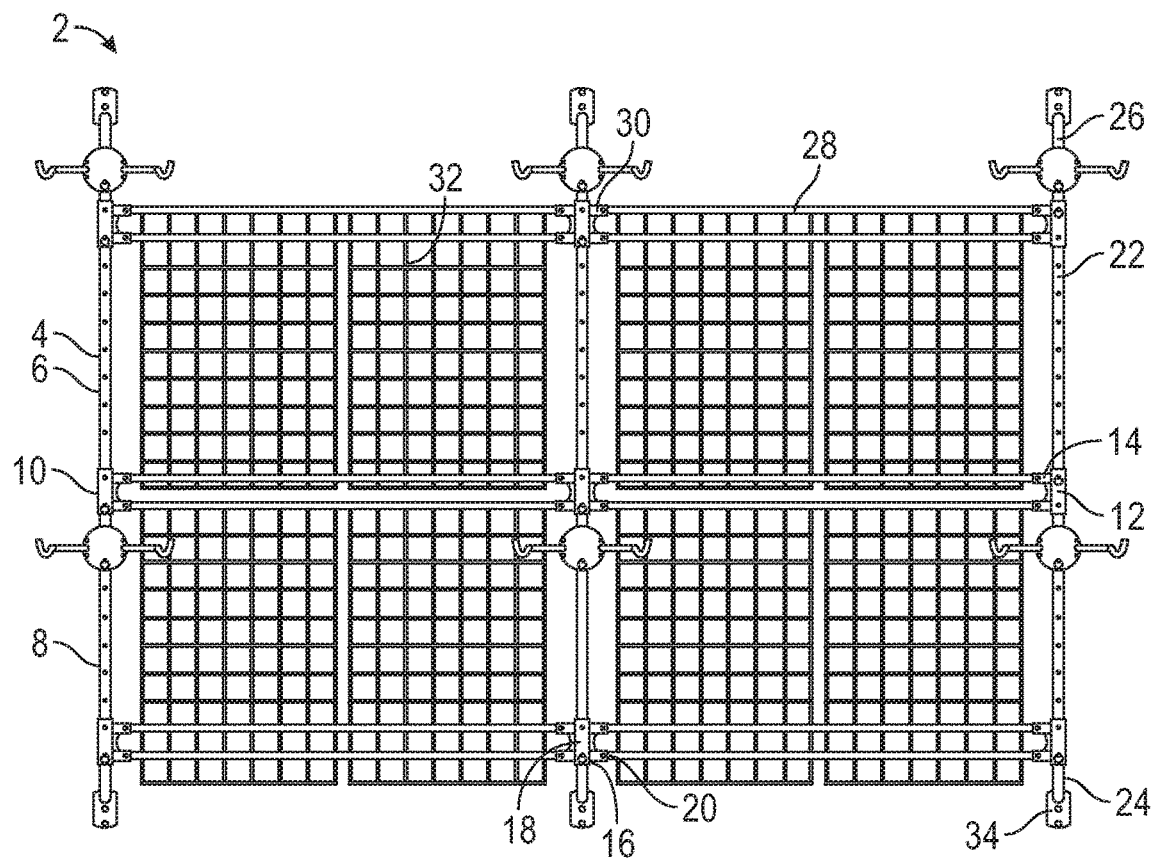
FIG. 1 is a front view of an implementation of a support rack.

Referring to FIG. 1, an implementation of a support rack 2 is illustrated fastened to a wall. The support rack 2 includes a plurality of posts 4 positioned substantially parallel to each other. In various implementations, the plurality of posts 4 include a first pole 6 and a second pole 8 coupled through a connector 10. The connector 10 includes a base 12 and two projections 14. Another implementation of a connector 16 includes a base 18 and two sets of projections 20. Each set of projections 20 is positioned on opposite sides of the base 18 of the connector 16. The plurality of posts 22 each have a first end 24 and a second end 26. The support rack also includes a plurality of rungs 28 coupled substantially perpendicularly to the plurality of posts 4 through a plurality of connectors 30. The plurality of posts may be formed of aluminum, steel, coated metal, metal alloys, and other materials that are capable of supporting the weight of the rack itself as well as items stored thereon.

In this implementation of a support rack, four grids 32 are coupled to the plurality of rungs 28. In various implementations, a support rack may include only one grid or more than one grid. The grids 32 are positioned between the plurality of posts 4. The support rack 2 includes a plurality of fasteners 34 coupled to the plurality of posts 22. The plurality of fasteners are each coupled to a first end 24 and a second end 26 of the plurality of posts 22. The plurality of fasteners 34 are configured to couple the support rack to a wall. The fasteners may be coupled to the wall through nails, bolts, screws, anchors, glue, adhesive, and other methods for coupling a structure to wall. In various implementations of a support rack, coupling the support rack to the wall may include the support rack fixedly attached to the wall or coupled to the wall through gravity induced bias force.

Figure 2:
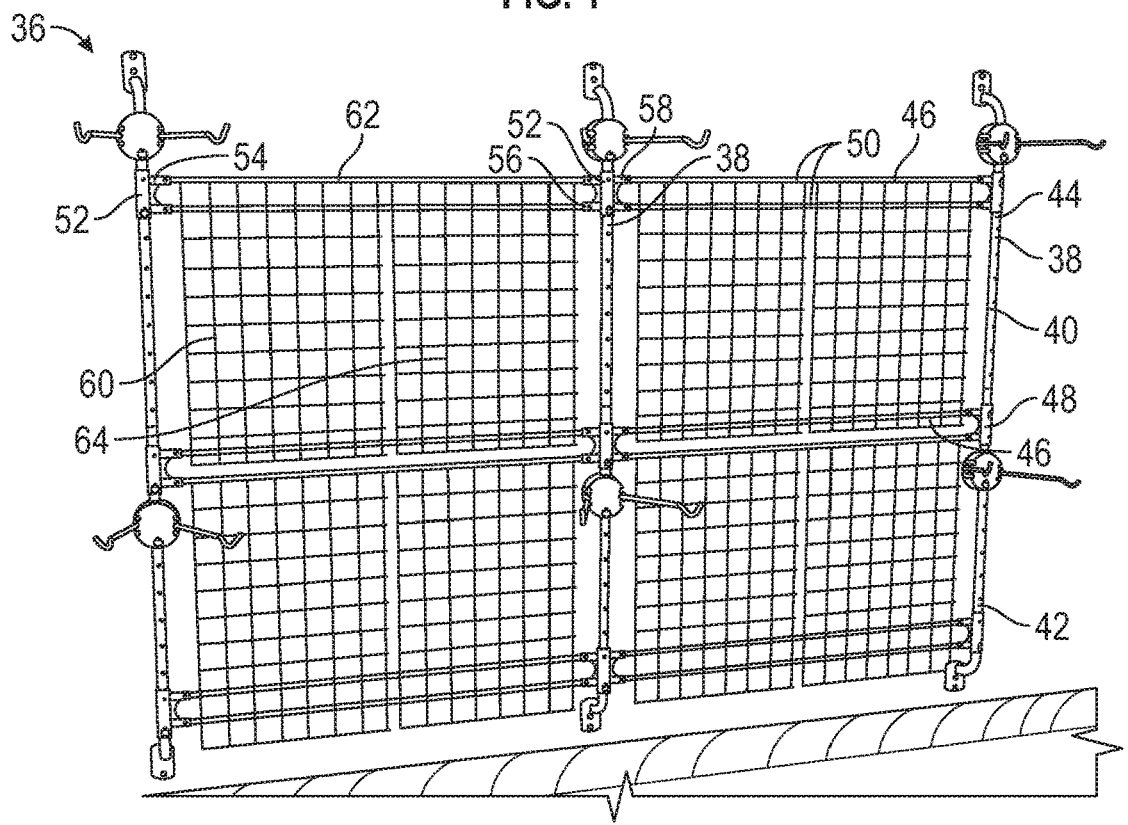
FIG. 2 is a side perspective view of an implementation of a support rack coupled to a wall.

Referring to FIG. 2, an implementation of a support rack 36 coupled to a wall is illustrated. The support rack 36 includes a first set of posts 38 substantially parallel to each other. Each post 40 has a first end 42 and a second end 44. A set of rungs 46 is coupled substantially perpendicularly to the first set of posts 38 through at least four connectors 48. Each rung may include two bars 50 substantially parallel to each other. In other implementations, each rung may include a single bar coupled substantially perpendicular with the posts. The connectors 48 coupling the set of rungs to the first set of posts 38 include a base 52 and either two projections 54 on a single side of the base 52 or two sets 56 and 58 of two projections where each set 56 is on a side of the base 52 opposite the other set 58.

A grid 60 is coupled to each of the set of rungs 62. In various implementations, a single grid may be coupled to a top bar of the plurality of rungs. In this particular implementation, two grids are coupled to the top rung and the grids are substantially parallel to one another. In some implementations, a single grid may have the same or similar width as two panels of grid side by side. In various implementations, the grids may be coupled to the set of rungs through pins, zip ties, screws, adhesive, and other ways to couple components to a rung. In some implementations, the grids may be coupled to both top rungs of the set of rungs and to the bottom rungs to provide a more secure support rack. In various implementations, the grids may be made of plastic, metal, coated metal, wire and other lightweight and durable materials capable of supporting items. This implementations of a support grid includes fasteners like those previously explained for coupling the support rack to the wall.

Figure 3:
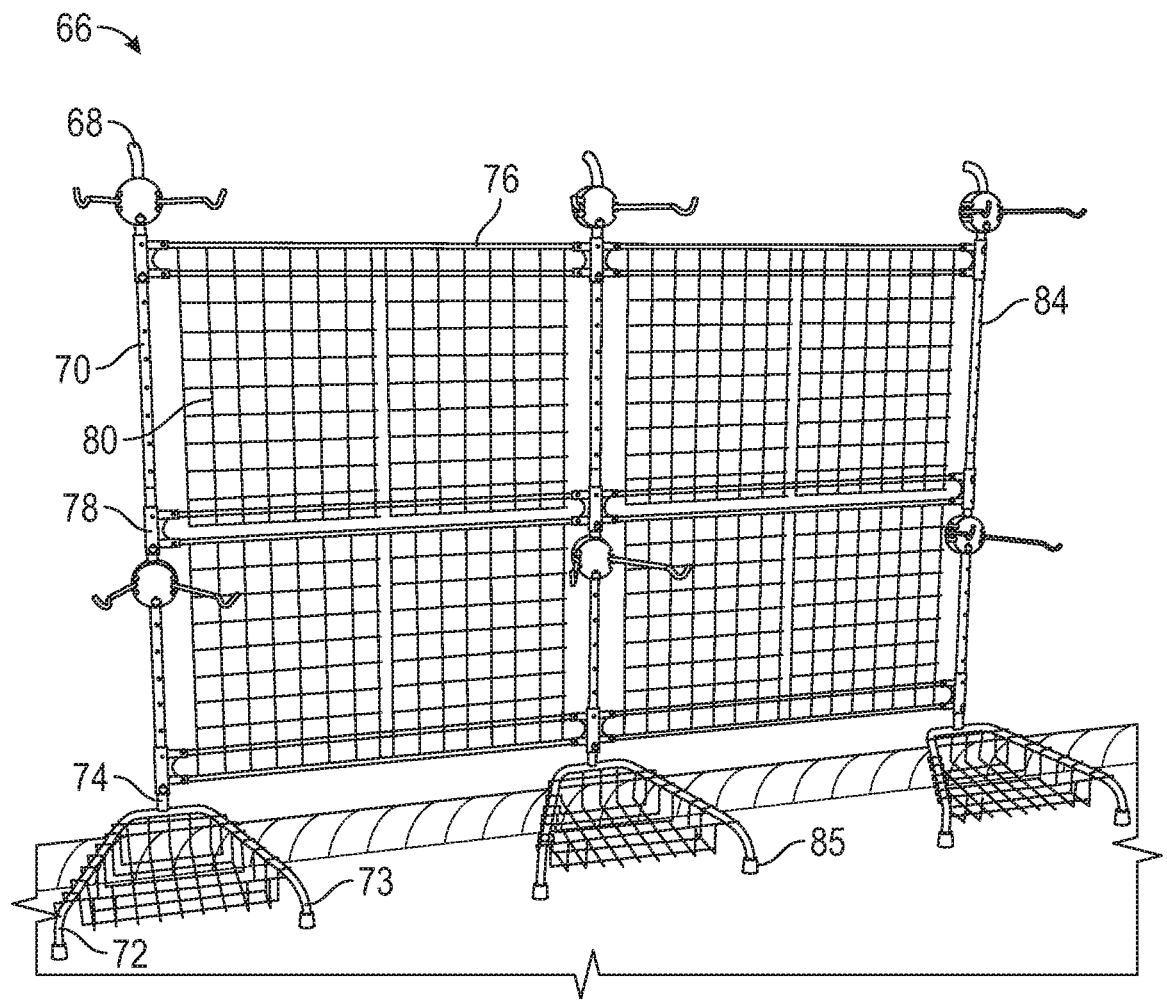
FIG. 3 is a side perspective view of another implementation of a support rack coupled to a wall.

Referring to FIG. 3, an implementation of a support rack 66 coupled to a wall is illustrated. In this implementation, the support rack 66 is coupled to the wall through pressure induced by gravity force applied to the rack and the items coupled thereto. The pressure from the rack 66 against the wall is applied to the wall at a second end 68 of the plurality of posts 70 and is generated through the cantilever effect of a pair of legs 72 and 73 coupled at a first end 74 of the plurality of posts 70. The support rack 66 includes a plurality of rungs 76 coupled substantially perpendicularly to the plurality of posts 70. The plurality of rungs are coupled to the posts through connectors as previously described. A plurality of grids 80 are coupled to the plurality of rungs 76 between the plurality of posts 70. One or more grids 80 may be coupled between each set of plurality of posts in various implementations.

Figure 4:
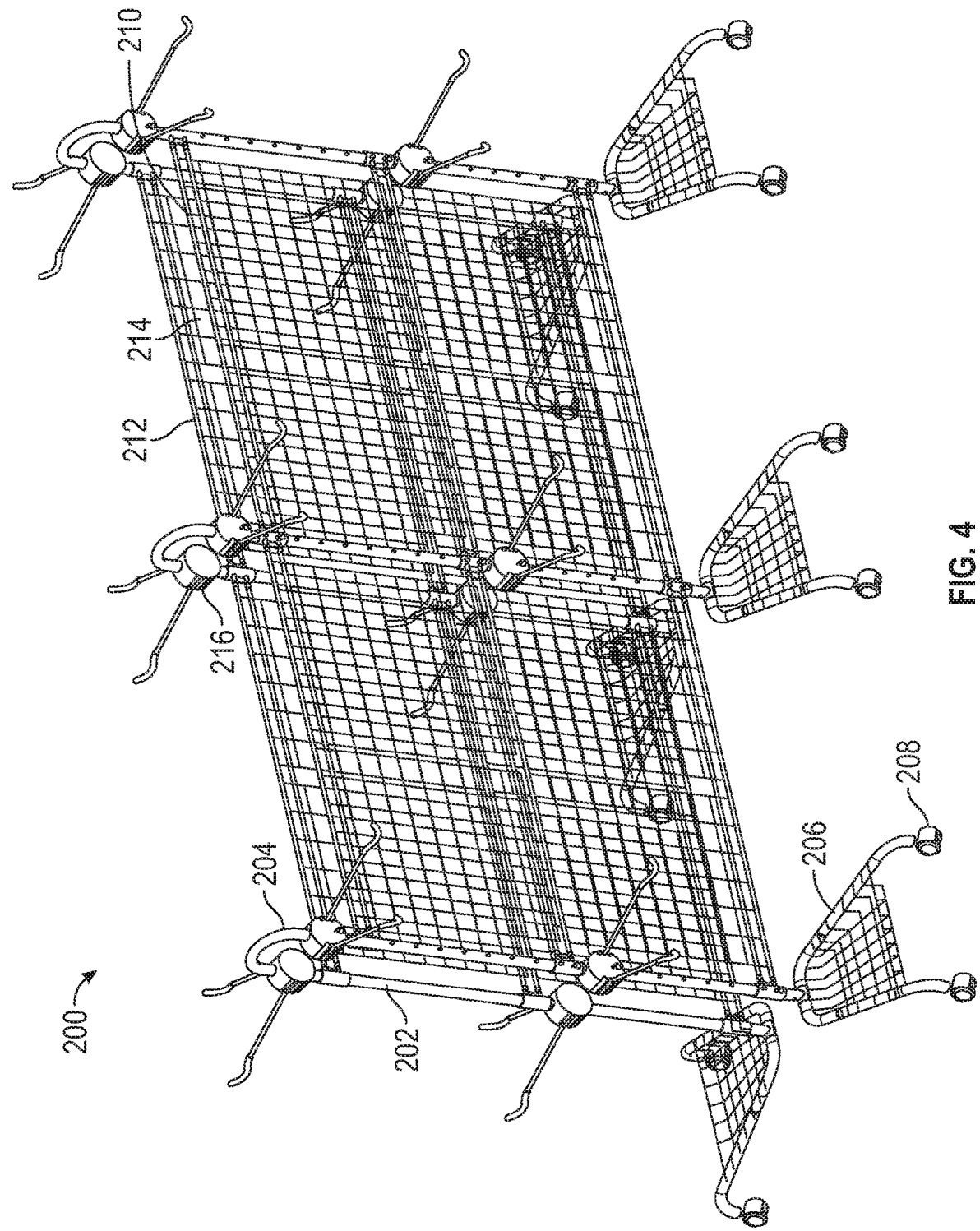
FIG. 4 is a side perspective view of a support rack including a plurality of opposing posts with corresponding supporting legs.

Referring to FIG. 4, an implementation of a support rack 200 including a plurality of opposing posts 202 is illustrated. The support rack 200 includes a plurality of posts 204 having a plurality of pairs of support legs 206 each coupled at a first end of the plurality of posts 204. The pairs of support legs 204 support the support rack 200 above a floor surface. In this implementation, casters 208 are coupled to a first end of the pairs of legs 204 and the support rack may be mobile along a floor surface. In other implementations, the support rack may include feet 85 coupled to the pairs of legs 72 and 73 as illustrated in FIG. 3. The support rack 200 also includes a plurality of rungs 210 coupled substantially perpendicularly to the plurality of posts. In this implementation, the plurality of opposing posts and the pair of opposing legs create a support rack having back to back rungs 212, grids 214, and hubs 216. Various implementations with opposing posts may provide a larger amount of storage using the support rack. Implementations including casters or other wheels or rollable devices attached to the legs may allow users to transport items between locations while they are on the support rack and allow the support rack to be moved across the floor surface. Mobility of the support rack may be useful for cleaning and rearranging rooms or storage facilities.

Figure 5:
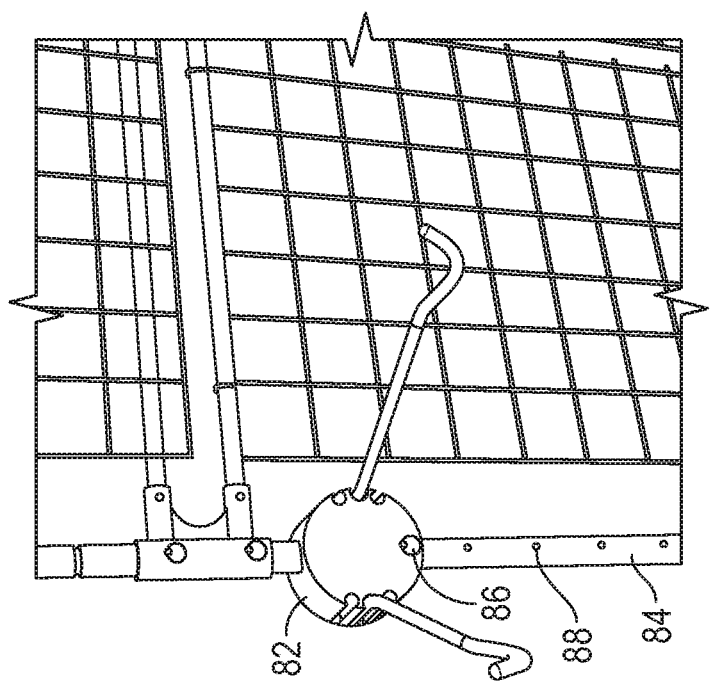
FIG. 5 is a side perspective view of an implementation of a hub coupled to an implementation of a support rack.
Figure 6:
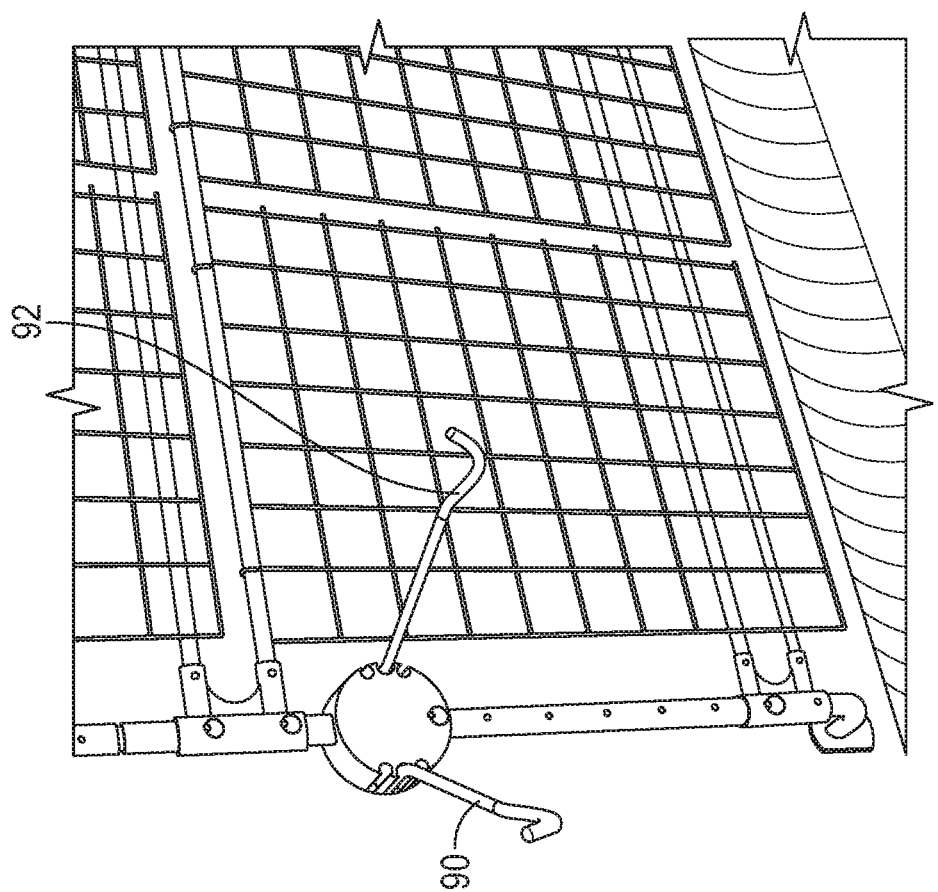
FIG. 6 is a close-up view of an implementation of a hub coupled to an implementation of a support rack coupled to a wall.
Figure 7:
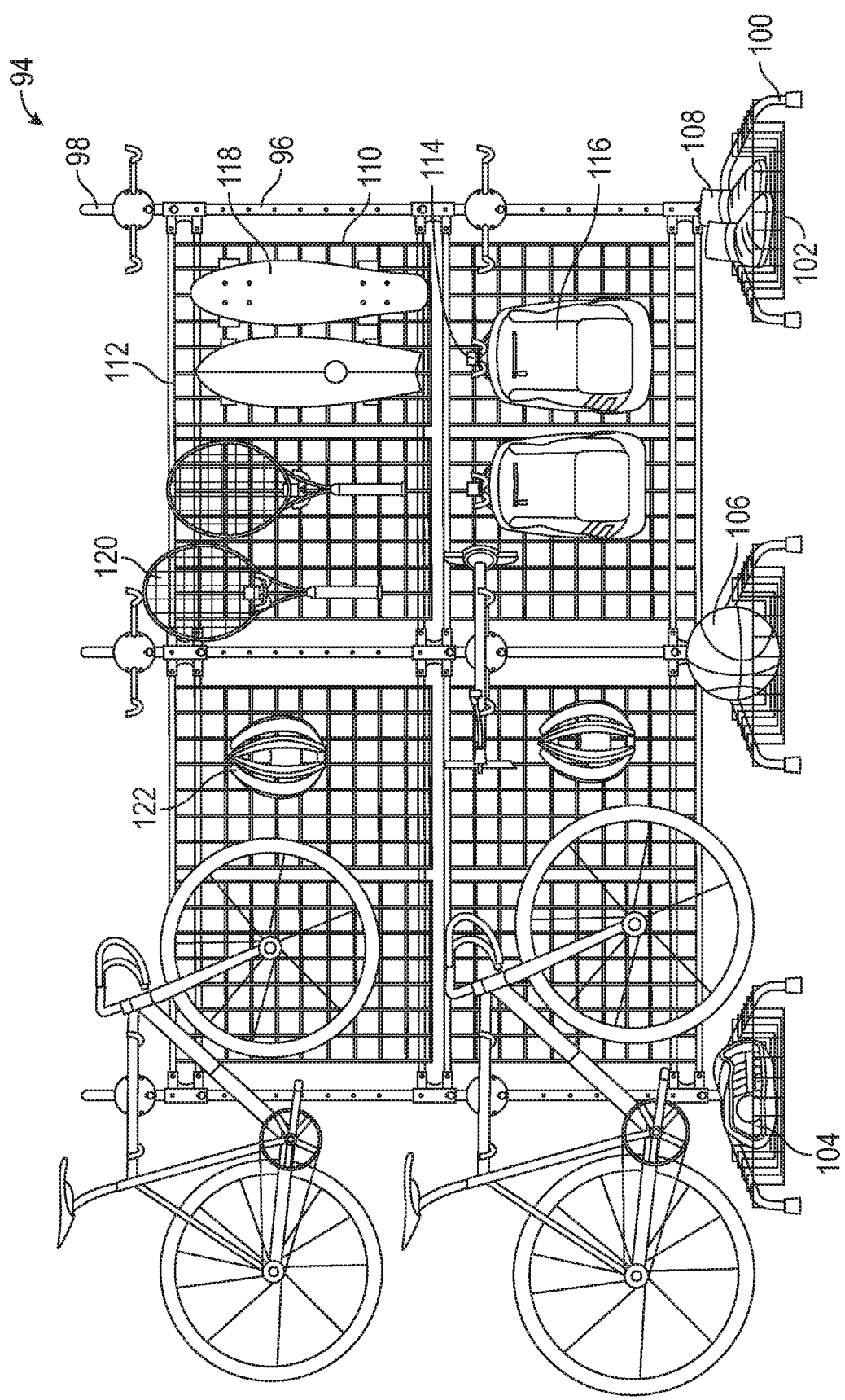
FIG. 7 is a front view of an implementation of a support rack having support legs coupled to a wall and supporting items including bicycles.
Figure 8:
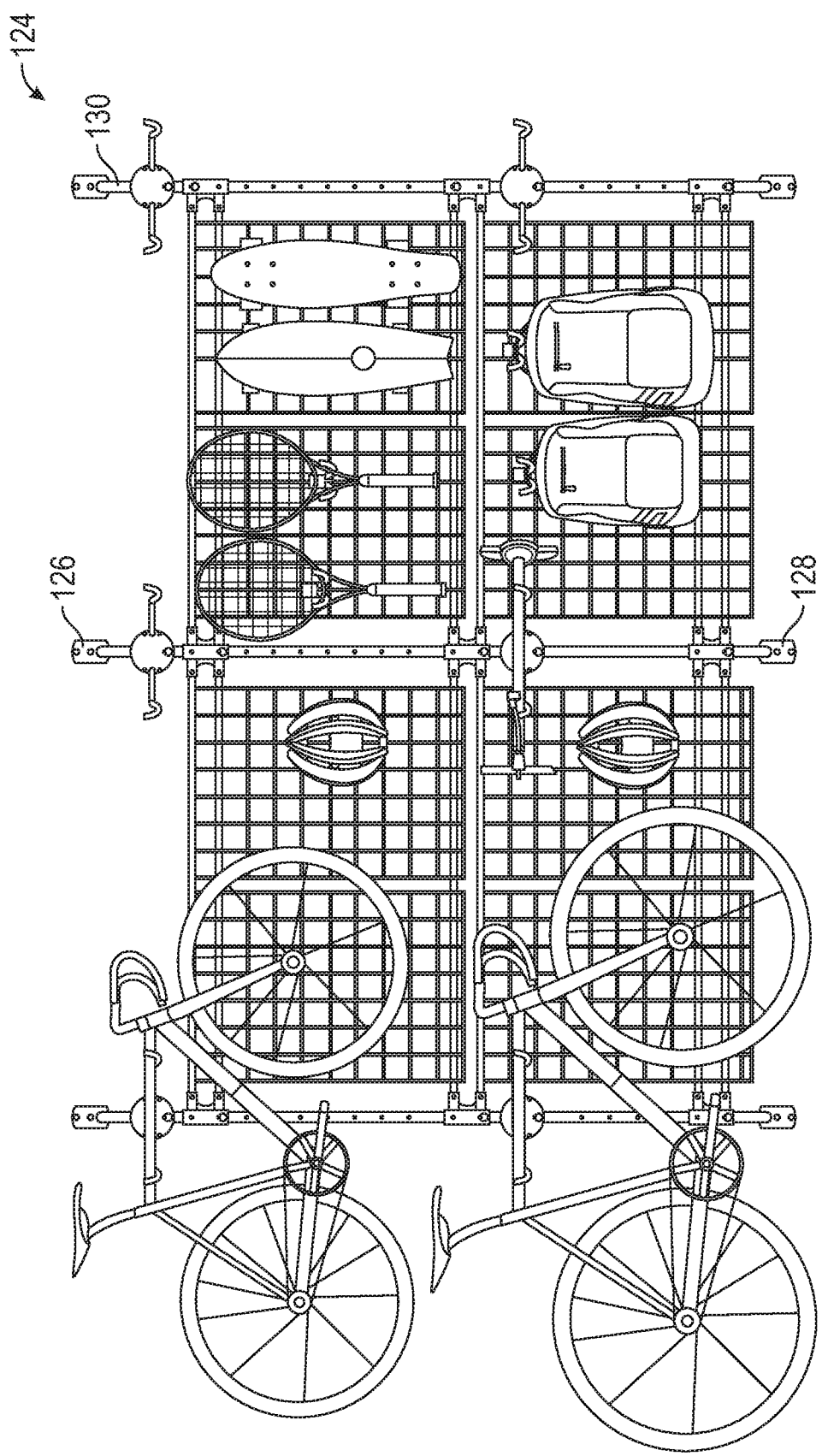
FIG. 8 is a front view of an implementation of a support rack having fasteners coupled to a wall and supporting items including bicycles.
Figure 9:
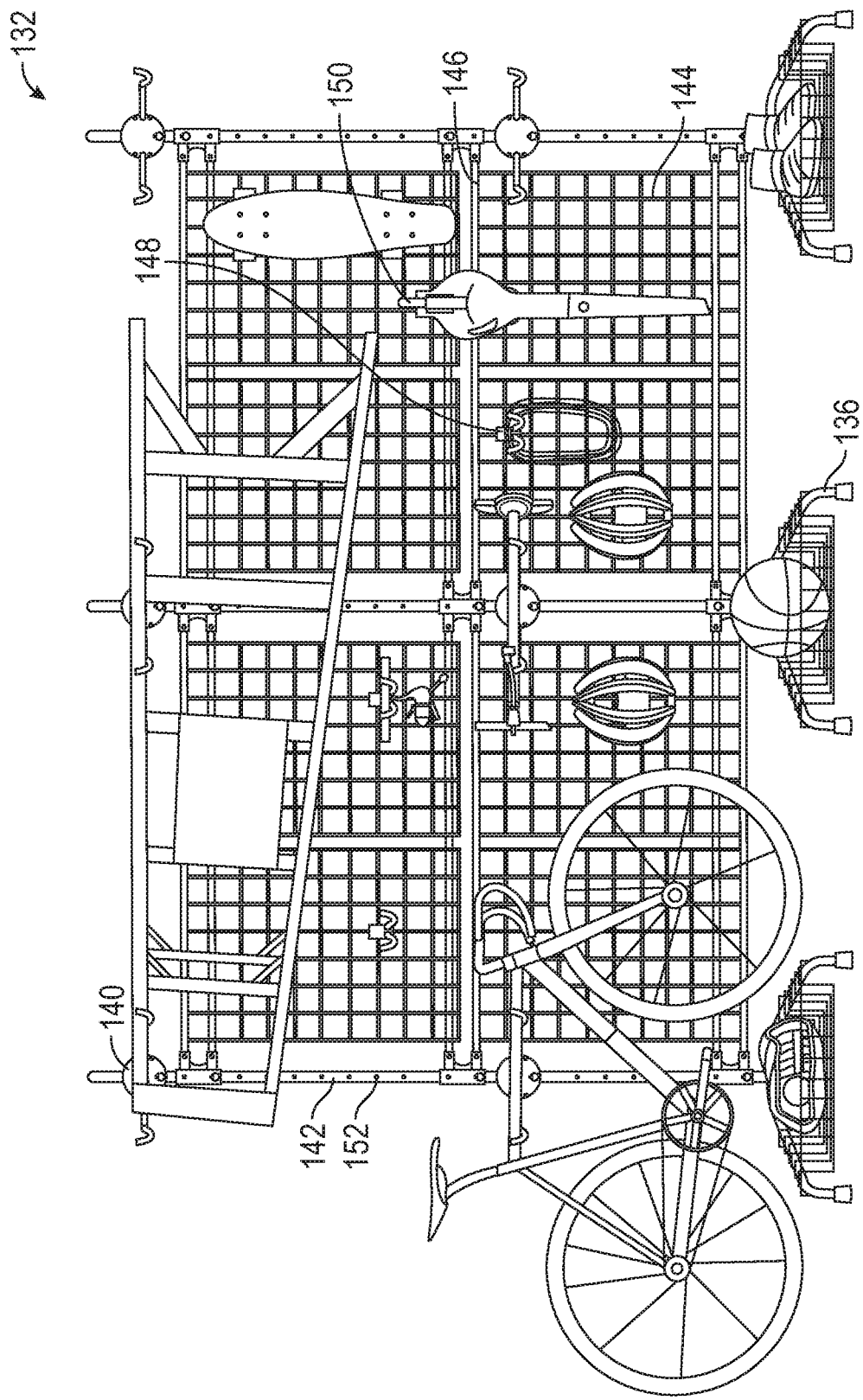
FIG. 9 is a front view of an implementation of a support rack having supports legs coupled to a wall and supporting items including a ladder.
Figure 10:
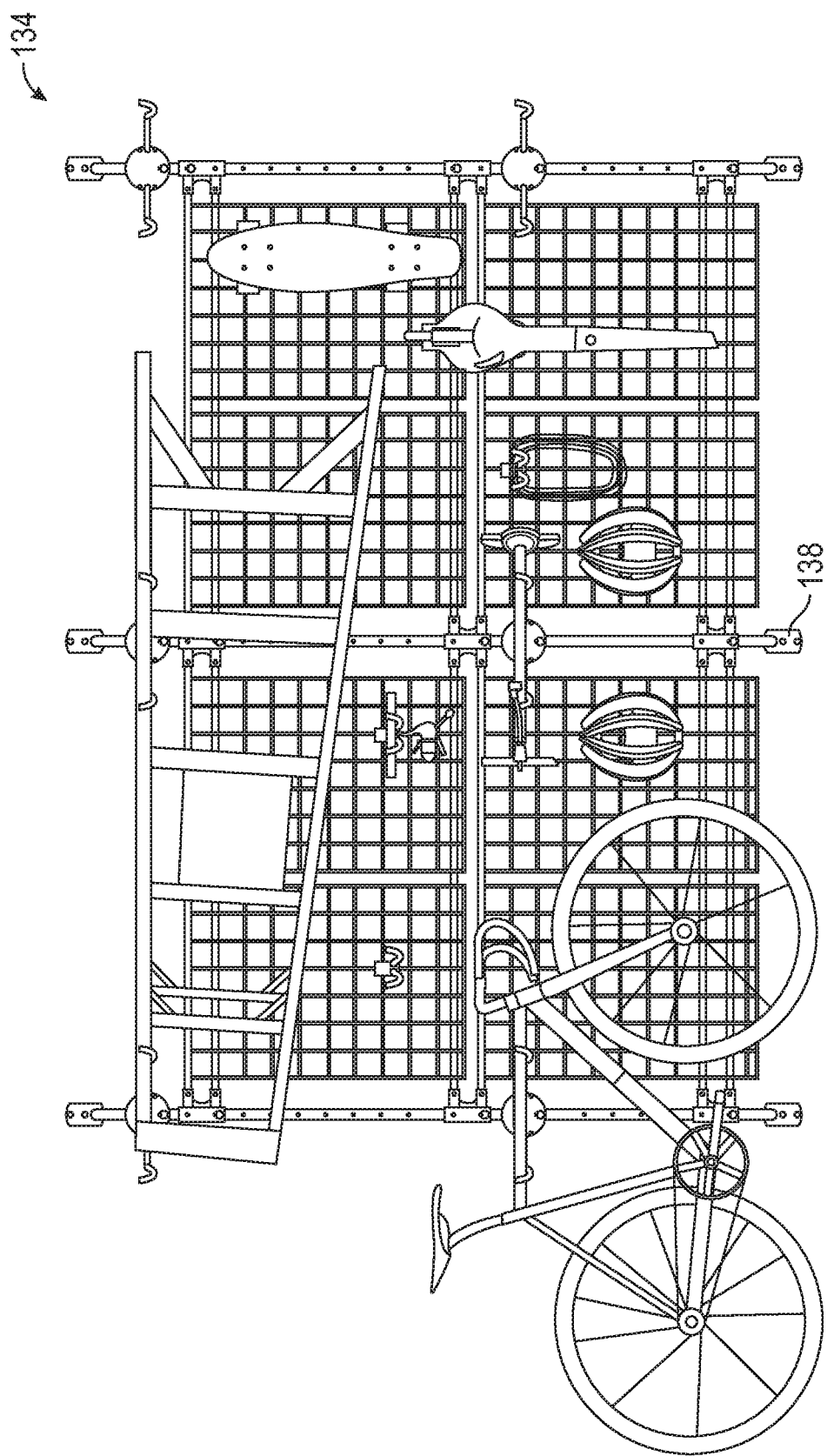
FIG. 10 is a front view of an implementation of a support rack having fasteners coupled to a wall and supporting items including a ladder.

Referring to FIGS. 5 and 6, implementations of support racks like those disclosed herein may include hubs 82 coupled to each of the plurality of posts 84. In various implementations, at least one hub 82 is coupled to the plurality of posts. In other implementations, two or more hubs may be coupled individually to each post. The hubs may be coupled to the plurality of posts through pins 86 inserted into holes 88 along the length of the plurality of posts. The hubs may include two arms 90 and 92 that are configured to support a bicycle as illustrated in FIGS. 7 and 8. As illustrated in FIGS. 9 and 10, the hubs may also support ladders. In various implementations the hubs may be configured to support bike pumps, hedge trimmers, pool cleaning sticks, and other large household and business items that may be stored horizontally.

Referring again to FIG. 7, an implementation of a support grid 94 supporting items is illustrated. This implementation of a support grid 94 is coupled to the wall through the plurality of posts 96 on a second end 98 of the posts and each pair of legs 100 coupled to a first end of the plurality of posts. A basket 102 is coupled between each pair of legs to add storage to the support rack 94. The baskets 102 may be used to support medium sized household items such as, by non-limiting example, a baseball mitt 104, a basketball 106, and boots 108. The support rack 94 also includes grids 110 coupled to rungs 112 between the plurality of posts 96. The grids include supports 114 to support items on the support rack. Here the supports are supporting backpacks 116, skateboards 118, tennis racks 120, and bicycle helmets 122. The supports 114 are configured to support a variety of items from sporting goods, tools, and various items typically stored in a garage. Various implementations of a support rack may be used in utility closets, storage rooms, gymnasiums and other locations requiring structures for storing large items that may be hung up for storage.

Referring to FIG. 8, an implementation of a support device 124 holding various items is illustrated. In this implementation, the support device includes fasteners 126 and 128 to fixedly couple the support rack 124 to a wall. The fasteners are coupled to a first end 128 and a second end 126 of each of the plurality of posts 130. The fasteners may be coupled to the plurality of posts through, by non-limiting example, friction fit, adhesive, a screw, a pin, or other methods for coupling to cylindrical pieces. The fasteners may be coupled to a wall through nails, screws, pins, anchors or other coupling devices for affixing an item to drywall, concrete, wood, or other wall materials.

Referring to FIGS. 9 and 10, implementations of a support rack 132 and 134, respectively, are illustrated. Referring to FIG. 9, the support rack includes the pair of support legs 136 for coupling the rack 132 to a wall. Referring to FIG. 10, the support rack 134 includes fasteners 138 to couple the support rack to a wall. FIGS. 9 and 10 illustrate the versatility in utility of the support rack. The hubs 140 coupled to the plurality of posts 142 may be used to hold, by non-limiting example, a ladder or a bicycle. The grids coupled to the sets of rungs include supports 148 and 150. In various implementations, the supports may be used to support cords 148 or power tools 150 and other items typically stored in a garage. As illustrated, support 148 is different than support 150 and can be used for supporting different items. In other implementations, other supports may be used that are design to couple to the grid. In still other implementations, supports may be coupled to the plurality of posts 142 through holes 152 located along a length of the posts.

In places where the description above refers to particular implementations of support racks and implementing components, sub-components, methods and sub-methods, it should be readily apparent that a number of modifications may be made without departing from the spirit thereof and that these implementations, implementing components, sub-components, methods and sub-methods may be applied to other support racks.

What is claimed is:
1. A support rack comprising:
a plurality of posts, each post configured to receive at least one circular hub coupled thereto, the at least one circular hub comprising at least two arms coupled thereto;
a plurality of rungs coupled substantially perpendicularly to the plurality of posts through a plurality of connectors,
one or more grids coupled to the plurality of rungs between the plurality of posts; and
a plurality of fasteners coupled to the plurality of posts, the plurality of fasteners configured to couple the support rack directly to a wall;
wherein the at least one circular hub is configured to support a bicycle through the at least two arms;
wherein the at least one circular hub is not coupled with one of a plurality of rungs.
2. The support rack of claim 1, wherein the plurality of connectors comprise a base and two or more projections.
3. The support rack of claim 1, wherein the plurality of posts each comprise holes along a length of each of the posts.
4. The support rack of claim 3, wherein the plurality of connectors are coupled to the plurality of posts through pins inserted into the holes.
5. The support rack of claim 3, wherein the at least one circular hub is coupled to the plurality of posts through the holes.
6. The support rack of claim 1, wherein the grid further comprises one or more supports coupled thereto configured to support items coupled to the grid.
7. A support rack comprising:
a plurality of freestanding posts, each freestanding post configured to receive at least one circular hub coupled thereto, the at least one circular hub comprising at least two arms coupled with the hub;
a plurality of rungs coupled substantially perpendicularly to the plurality of freestanding posts through a plurality of connectors;
a plurality of one or more grids coupled to the plurality of rungs between the plurality of freestanding posts; and
a pair of legs coupled at a first end of the plurality of posts, the pair of legs configured to support the support rack above a floor surface;
wherein the at least circular one hub is configured to support a bicycle through the at least two arms;
wherein the at least one circular hub is coupled only to the each of the plurality of freestanding posts.
8. The support rack of claim 7, wherein the plurality of freestanding posts are configured to couple the support rack to a wall.
9. The support rack of claim 7, wherein the plurality of freestanding posts and the pair of legs coupled at a first end of the plurality of freestanding posts further comprise a plurality of opposing freestanding posts and a pair of opposing legs.
10. The support rack of claim 7, wherein the plurality of freestanding posts each comprise holes along a length of each of the freestanding posts.
11. The support rack of claim 10, wherein the plurality of connectors are coupled to the plurality of freestanding posts through pins inserted into the holes.
12. The support rack of claim 10, wherein the at least one circular hub is coupled to the plurality of freestanding posts through the holes.
13. The support rack of claim 7, wherein the grid further comprises one or more supports coupled thereto configured to support items coupled to the grid.
14. A support rack comprising:
a first set of posts substantially parallel to each other, each post comprising a first end and a second end;
a set of rungs coupled substantially perpendicularly to the first set of posts through at least four connectors; and
a grid coupled to each of the set of rungs;
wherein the first set of posts is configured to support one or more circular hubs thereon, the one or more circular hubs configured to support a bicycle through two arms coupled with the circular one or more hubs; and wherein the support rack is configured to be coupled directly to a wall;

wherein the one or more circular hubs is not coupled with the set of rungs.

15. The support rack of claim 14, wherein the four connectors are coupled to the first set of posts through pins.

16. The support rack of claim 14, further comprising fasteners coupled to the first end and the second end of the first set of posts, the fasteners configured to couple the support rack to a wall.

17. The support rack of claim 14, further comprising a pair of legs coupled at a first end of the first set of posts, the pair of legs configured to support the support rack against a wall.

18. The support rack of claim 17, further comprising a basket coupled to the pair of legs.

\* \* \* \* \*